(12) United States Patent
Ito et al.

(10) Patent No.: US 11,402,838 B1
(45) Date of Patent: Aug. 2, 2022

(54) SYSTEM FOR AND METHOD OF CONTROLLING WATERCRAFT

(71) Applicant: YAMAHA HATSUDOKI KABUSHIKI KAISHA, Iwata (JP)

(72) Inventors: Makoto Ito, Shizuoka (JP); Yoshikazu Nakayasu, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 504 days.

(21) Appl. No.: 16/219,989

(22) Filed: Dec. 14, 2018

Related U.S. Application Data

(60) Provisional application No. 62/607,427, filed on Dec. 19, 2017.

(51) Int. Cl.
*G05D 1/02* (2020.01)
*B63H 20/12* (2006.01)
*B63H 25/42* (2006.01)
*B63H 21/21* (2006.01)
*B63H 20/00* (2006.01)

(52) U.S. Cl.
CPC ........... *G05D 1/0206* (2013.01); *B63H 20/12* (2013.01); *B63H 25/42* (2013.01); *B63H 2020/003* (2013.01); *B63H 2021/216* (2013.01)

(58) Field of Classification Search
CPC .... G05D 1/0206; B63H 21/265; B63H 25/42; B63H 20/12; B63H 2020/003; B63H 2021/216
See application file for complete search history.

(56) References Cited

U.S. PATENT DOCUMENTS

2007/0089660 A1* 4/2007 Bradley ................. B63H 25/42
114/144 A
2017/0255201 A1* 9/2017 Arbuckle ................ B63B 79/40

FOREIGN PATENT DOCUMENTS

JP 2014-24421 A 2/2014

* cited by examiner

*Primary Examiner* — Aniss Chad
*Assistant Examiner* — Chase L Cooley
(74) *Attorney, Agent, or Firm* — Keating and Bennett, LLP

(57) ABSTRACT

A controller controls a propulsion device such that a position of a watercraft is maintained in a front-and-back direction with respect to a standard line extending from a set point in a lateral direction while a direction of the watercraft is maintained along a standard direction defined as the direction of the set point. The controller determines whether or not the watercraft is moving away from the set point in the lateral direction. The controller changes the standard direction in a specific direction by controlling the propulsion device when the watercraft is moving away from the set point in the lateral direction. The controller changes the direction of the watercraft in accordance with the changed standard direction. The controller repeats determining whether or not the watercraft is moving, changing the standard direction, and changing the direction of the watercraft.

20 Claims, 14 Drawing Sheets

SYSTEM FOR AND METHOD OF CONTROLLING WATERCRAFT

CROSS REFERENCE TO RELATED APPLICATIONS

This application claims the benefit of priority to U.S. Patent Application No. 62/607,427 filed on Dec. 19, 2017. The entire contents of this application are hereby incorporated herein by reference.

BACKGROUND OF THE INVENTION

1. Field of the Invention

The present invention relates to a system for and a method of controlling a watercraft.

2. Description of the Related Art

A control system for steadily keeping a watercraft at a predetermined set point has been previously proposed. For example, Japan Laid-open Patent Application Publication No. JP2014-24421A describes that the position of a watercraft is measured using GPS. A control device herein determines a water route to a set point from the position of the watercraft at a present point of time. The control device controls a power source, a propeller, a rudder and so forth in accordance with the determined water route.

When the position of the watercraft is displaced from the set point, the watercraft is controlled to return to the set point. However, chances are that the watercraft will float or be moved off course due to water streams or wind or moves before the direction thereof is absolutely changed to face the set point, such that it often takes time for the watercraft to precisely return to the set point.

Additionally, in the vicinity of the set point, even a slight change in position of the watercraft will change the direction in which the watercraft should be headed. Because of this, the direction of the watercraft must be frequently changed, and the movement thereof becomes overactive. This is considered as a drawback.

SUMMARY OF THE INVENTION

Preferred embodiments of the present invention provide systems for and methods of controlling a watercraft, such that the watercraft is maintained at a set point with as little movement as possible without frequently changing the direction thereof.

A first preferred embodiment of the present invention provides a system that controls a watercraft. The system includes a propulsion device, a sensor, and a controller. The sensor detects a position and a direction of the watercraft. The controller communicates with the propulsion device and the sensor. The controller obtains the position and the direction of a set point of the watercraft. The controller obtains position data indicating the current position of the watercraft and direction data indicating the current direction of the watercraft. The controller controls the propulsion device such that the position of the watercraft is maintained in a front-and-back direction with respect to a standard line extending from the set point in a lateral direction while the direction of the watercraft is maintained along a standard direction defined as the direction of the set point. The controller determines whether or not the watercraft is moving away from the set point in the lateral direction. The controller changes the standard direction in a specific direction by controlling the propulsion device when the watercraft is moving away from the set point in the lateral direction. The controller changes the direction of the watercraft in accordance with the changed standard direction. The controller repeats determining whether or not the watercraft is moving, changing the standard direction and changing the direction of the watercraft.

A second preferred embodiment of the presently invention provides a method of controlling a watercraft including a propulsion device. The method includes the following processing. First processing obtains a position and a direction of a set point for the watercraft. Second processing obtains position data indicating the current position of the watercraft and direction data indicating the current direction of the watercraft. Third processing controls the propulsion device such that the position of the watercraft is maintained in a front-and-back direction with respect to a standard line extending from the set point in a lateral direction while the direction of the watercraft is maintained along a standard direction defined as the direction of the set point. Fourth processing determines whether or not the watercraft is moving away from the set point in the lateral direction. Fifth processing changes the standard direction in a specific direction by controlling the propulsion device when the watercraft is moving away from the set point in the lateral direction. Sixth processing changes the direction of the watercraft in accordance with the changed standard direction. Seventh processing repeats determining whether or not the watercraft is moving, changes the standard direction and changes the direction of the watercraft.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
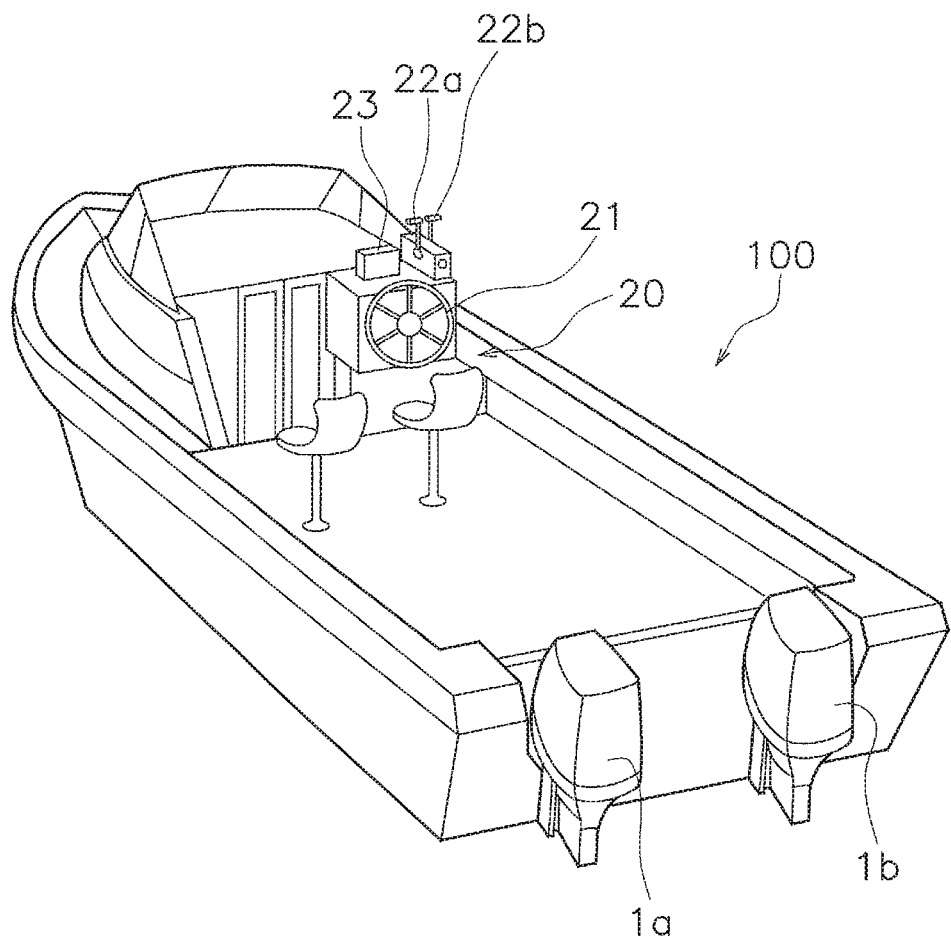
FIG. 1 is a schematic diagram of a watercraft in which a watercraft control system according to a preferred embodiment of the present invention is embedded.

Preferred embodiments of the present invention will be hereinafter explained with reference to the drawings. FIG. 1 is a schematic diagram of a watercraft 100 in which a control system according to a preferred embodiment is included. As shown in FIG. 1, the control system includes a plurality of outboard motors 1a and 1b. Specifically, the watercraft 100 preferably includes a left outboard motor 1a and a right outboard motor 1b.

The outboard motors 1a and 1b are preferably attached to the stern of the watercraft 100. The outboard motors 1a and 1b are disposed in alignment in the width direction of the watercraft 100. Specifically, the left outboard motor 1a is preferably disposed on the port side of the watercraft 100 and the right outboard motor 1b is preferably disposed on the starboard side of the watercraft 100. Each of the outboard motors 1a and 1b generates a thrust that propels the watercraft 100.

Figure 2:
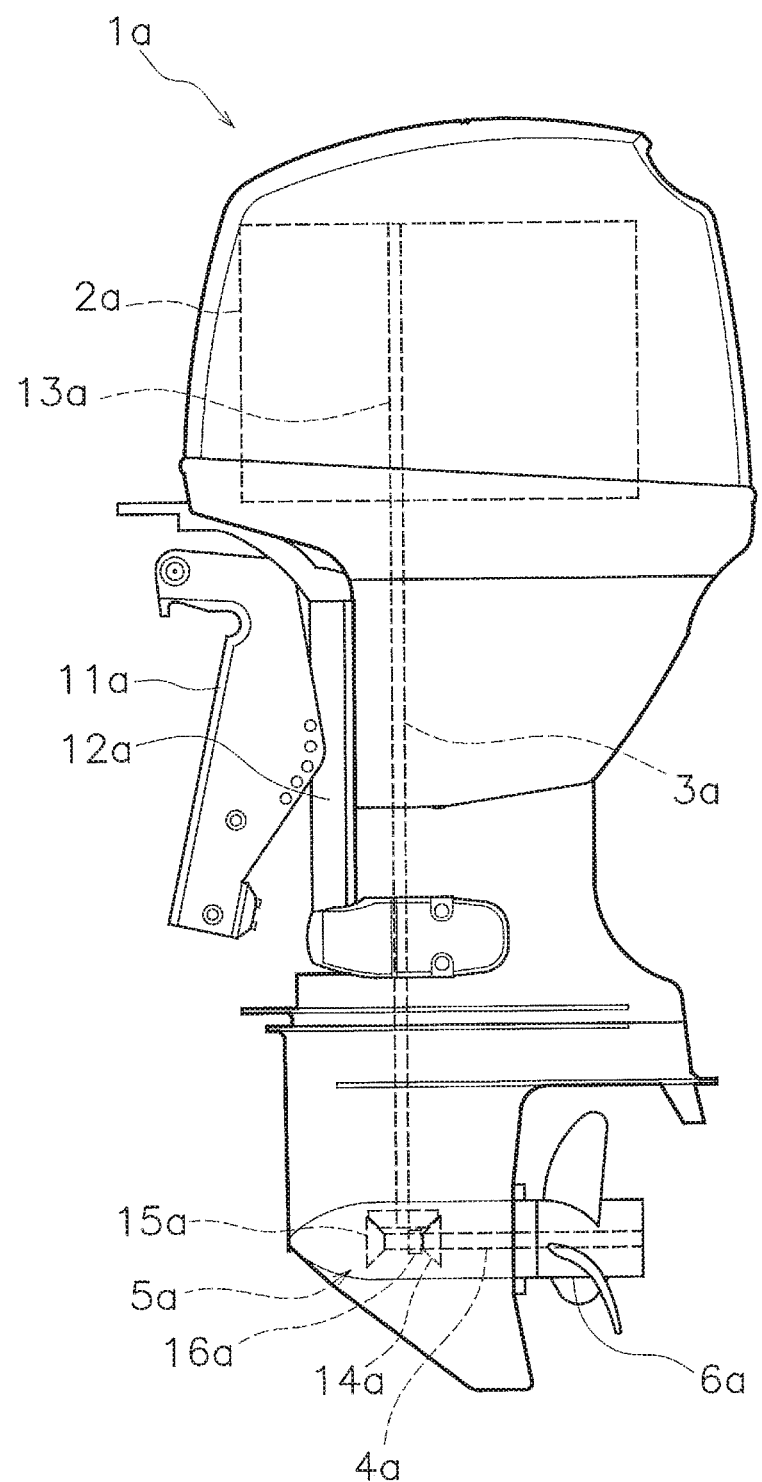
FIG. 2 is a side view of an outboard motor according to a preferred embodiment of the present invention.

FIG. 2 is a side view of the left outboard motor 1a. A structure of the left outboard motor 1a will be hereinafter explained. However, the right outboard motor 1b also preferably has the same or a similar structure to the left outboard motor 1a. The left outboard motor 1a is preferably attached to the watercraft 100 through a bracket 11a. The bracket 11a supports the left outboard motor 1a such that the left outboard motor 1a is rotatable about a steering shaft 12a. The steering shaft 12a extends in the vertical direction.

The left outboard motor 1a preferably includes an engine 2a, a drive shaft 3a, a propeller shaft 4a, and a shift mechanism 5a. The engine 2a generates a thrust that propels the watercraft 100. The engine 2a includes a crankshaft 13a. The crankshaft 13a extends in the vertical direction. The drive shaft 3a is connected to the crankshaft 13a. The drive shaft 3a extends in the vertical direction. The propeller shaft 4a extends in the front-and-back direction. The propeller shaft 4a is connected to the drive shaft 3a through the shift mechanism 5a. A propeller 6a is attached to the propeller shaft 4a.

The shift mechanism 5a preferably includes a forward moving gear 14a, a rearward moving gear 15a, and a clutch 16a. When gear engagement is switched between the gears 14a and 15a by the clutch 16a, the direction of rotation transmitted from the drive shaft 3a to the propeller shaft 4a is switched. Movement of the watercraft 100 is thus switched between forward movement and rearward movement.

Figure 3:
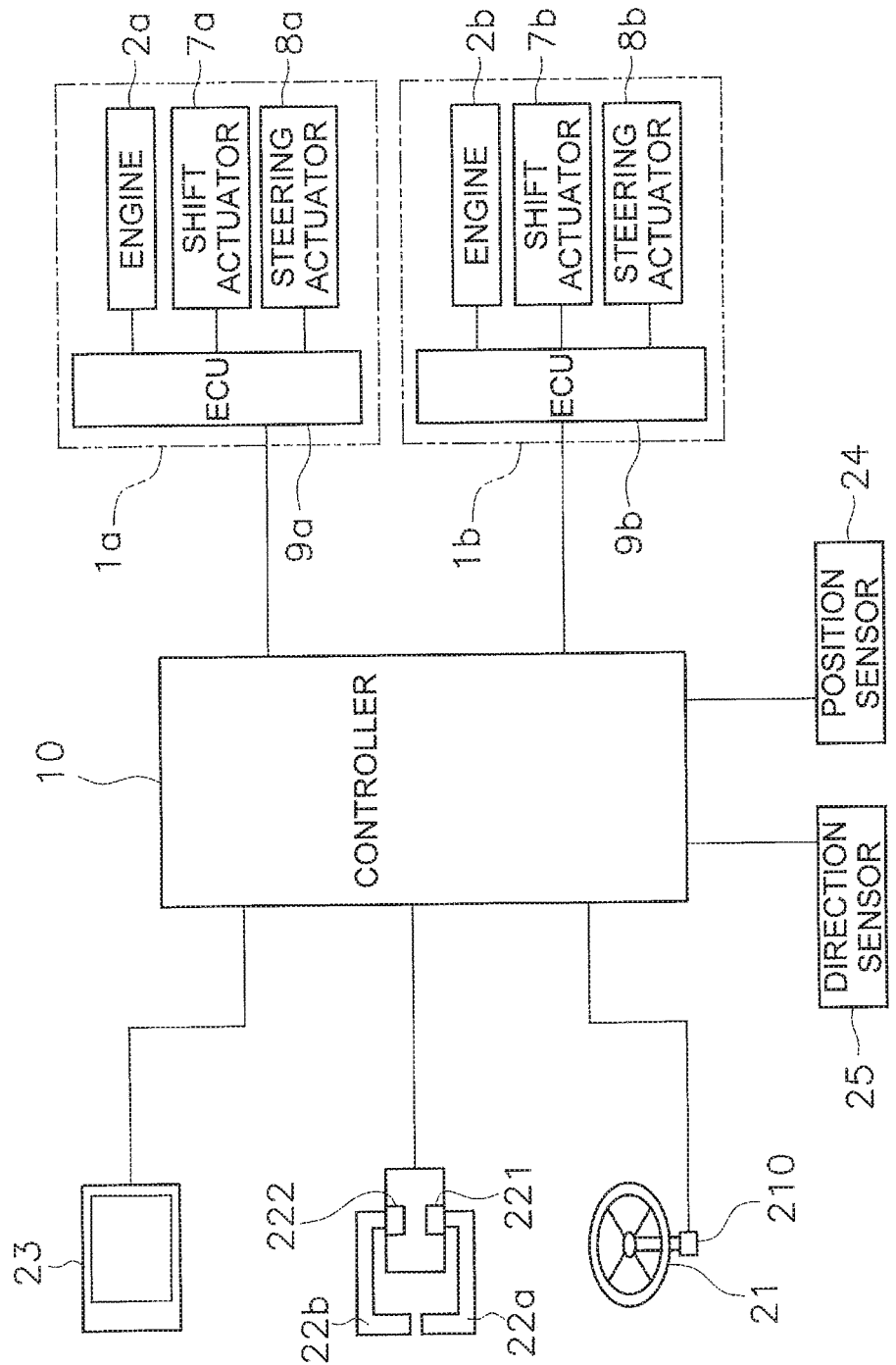
FIG. 3 is a schematic configuration diagram of the watercraft control system.

FIG. 3 is a schematic configuration diagram of a control system of the watercraft 100 according to a preferred embodiment of the present invention. As shown in FIG. 3, the left outboard motor 1a preferably includes a shift actuator 7a and a steering actuator 8a.

The shift actuator 7a is connected to the clutch 16a of the shift mechanism 5a. The shift actuator 7a actuates the clutch 16a so as to switch gear engagement between the gears 14a and 15a. Movement of the watercraft 100 is thus switched between forward movement and rearward movement. The shift actuator 7a is preferably, for example, an electric motor. It should be noted that the shift actuator 7a may be any other type of actuator such as, for example, an electric cylinder, a hydraulic motor, a hydraulic cylinder, etc.

The steering actuator 8a is connected to the left outboard motor 1a. The steering actuator 8a rotates the left outboard motor 1a about the steering shaft 12a. The rudder angle of the left outboard motor 1a is thus changed. The steering actuator 8a is preferably, for example, an electric motor. It should be noted that the shift actuator 7a may be any other type of actuator such as, for example, an electric cylinder, a hydraulic motor, or a hydraulic cylinder.

The left outboard motor 1a includes an ECU (electric control unit) 9a. The ECU 9a preferably includes a processor such as a CPU and memory such as, for example, a RAM and a ROM. The ECU 9a stores a program and data that controls the left outboard motor 1a. The ECU 9a controls actions of the engine 2a, the shift actuator 7a and the steering actuator 8a.

As shown in FIG. 3, the right outboard motor 1b preferably includes an engine 2b, a shift actuator 7b, a steering actuator 8b, and an ECU 9b. The engine 2b, the shift actuator 7b, the steering actuator 8b, and the ECU 9b in the right outboard motor 1b are preferably configured the same as or similarly to the engine 2a, the shift actuator 7a, the steering actuator 8a, and the ECU 9a in the left outboard motor 1a, respectively.

The control system preferably includes a steering wheel 21, throttle levers 22a and 22b, and an input device 23. As shown in FIG. 1, the steering wheel 21, the throttle levers 22a and 22b, and the input device 23 are preferably disposed in a cockpit 20 of the watercraft 100.

The steering wheel 21 is a device that allows an operator to operate the turning direction of the watercraft 100. The steering wheel 21 includes a sensor 210. The sensor 210 outputs a signal indicating the operating direction and the operating amount of the steering wheel 21.

The throttle levers 22a and 22b include a first lever 22a and a second lever 22b. The first lever 22a is a device that allows the operator to regulate the magnitude of a thrust generated by the left outboard motor 1a. Additionally, the first lever 22a is a device that allows the operator to switch the direction of the thrust generated by the left outboard motor 1a between forward and rearward directions. The first lever 22a is disposed to be operable from a neutral position to a forwardly moving directional side and a rearwardly moving directional side. The first lever 22a includes a sensor 221. The sensor 221 outputs a signal indicating the operating direction and the operating amount of the first lever 22a.

The second lever 22b is a device that allows the operator to regulate the magnitude of a thrust generated by the right outboard motor 1b. Additionally, the second lever 22b is a device that allows the operator to switch the direction of the thrust generated by the right outboard motor 1b between forward and rearward directions. The second lever 22b is operable from a neutral position to a forwardly moving directional side and a rearwardly moving directional side. The second lever 22b includes a sensor 222. The sensor 222 outputs a signal indicating the operating direction and the operating amount of the second lever 22b.

The control system includes a controller 10. The controller 10 preferably includes a processor such as a CPU and memory such as, for example, a RAM and a ROM. The controller 10 stores a program and data used to control the right and left outboard motors 1b and 1a. The controller 10 is connected to the ECUs 9a and 9b through wired or wireless communication. The controller 10 is connected to the steering wheel 21 and the throttle levers 22a and 22b through wired or wireless communication.

The controller 10 receives signals from the sensors 210, 221 and 222. The controller 10 outputs command signals to the ECUs 9a and 9b based on the signals from the sensors 210, 221 and 222.

For example, the controller 10 outputs a command signal to the shift actuator 7a in accordance with the operating direction of the first lever 22a. Movement of the left outboard motor 1a is thus switched between forward movement and rearward movement. The controller 10 outputs a command signal to the engine 2a in accordance with the operating amount of the first lever 22a. The engine rotational speed of the left outboard motor 1a is thus controlled.

The controller 10 outputs a command signal to the shift actuator 7b in accordance with the operating direction of the second lever 22b. Movement of the right outboard motor 1b is thus switched between forward movement and rearward movement. The controller 10 outputs a command signal to the engine 2b in accordance with the operating amount of the second lever 22b. The engine rotational speed of the right outboard motor 1b is thus controlled.

The controller 10 outputs command signals to the steering actuators 8a and 8b in accordance with the operating direction and the operating amount of the steering wheel 21. When the steering wheel 21 is operated leftward from the neutral position, the controller 10 controls the steering actuators 8b and 8a such that the right and left outboard motors 1b and 1a are rotated rightward. The watercraft 100 thus turns leftward. When the steering wheel 21 is operated rightward from the neutral position, the controller 10 controls the steering actuators 8b and 8a such that the right and left outboard motors 1b and 1a are rotated leftward. The watercraft 100 thus turns rightward. Additionally, the controller 10 controls the rudder angles of the right and left outboard motors 1b and 1a in accordance with the operating amount of the steering wheel 21.

The control system includes a position sensor 24 and a direction sensor 25. The position sensor 24 detects position data indicating the current position of the watercraft 100. The position sensor 24 preferably includes an antenna and a receiver, both of which are of a GNSS (Global Navigation Satellite System) type such as a GPS (Global Positioning System) type. It should be noted that the position sensor 24 may be any other desirable type of position sensing device. The position sensor 24 outputs a signal indicating the position data.

The direction sensor 25 detects direction data indicating the current direction of the watercraft 100. The direction sensor 25 is preferably a device such as, for example, an electronic compass, a gyro sensor, an IMU (Inertial Measurement Unit), etc. It should be noted that the direction sensor 25 may be any other desirable type of direction sensing device. The direction sensor 25 outputs a signal indicating the position data. It should be noted that the controller 10 may detect the current direction of the watercraft 100 based on a result detected by the position sensor 24 instead of the direction sensor 25.

The input device 23 is a device that allows the operator to input a mode of automatic control of the watercraft 100. In the present preferred embodiment, the controller 10 automatically controls the watercraft 100 such that the position of the watercraft 100 is maintained in the position of the set point while the direction of the watercraft 100 is maintained along the direction of the set point. The operator is allowed to set the set point using the input device 23. The input device 23 is preferably, for example, a touchscreen. It should be noted that the input device 23 may be any other desired type of device such as, for example, a mechanical switch. The input device 23 outputs a signal indicating the content of operation inputted by the operator.

The controller 10 is connected to the position sensor 24, the direction sensor 25, and the input device 23 through wired or wireless communication. The controller 10 receives signals from the position sensor 24, the direction sensor 25, and the input device 23. Under the automatic control, the controller 10 controls the engines 2a and 2b, the shift actuators 7a and 7b, and the steering actuators 8a and 8b based on the signals from the position sensor 24, the direction sensor 25, and the input device 23. Processing of automatic control executed by the controller 10 will be hereinafter explained in detail.

Figure 4:
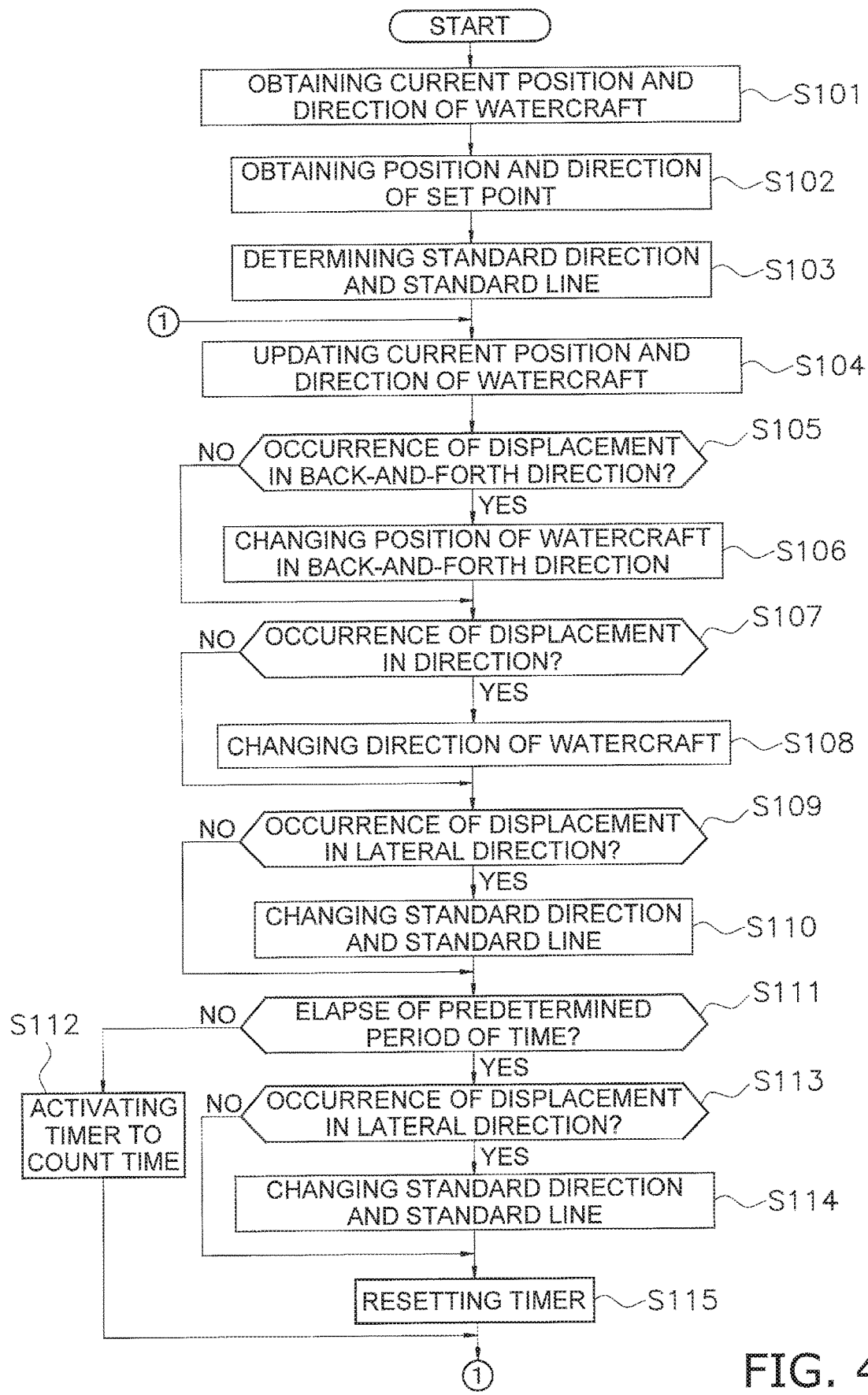
FIG. 4 is a flowchart showing processing of automatic control executed by a controller according to a first preferred embodiment of the present invention.

FIG. 4 is a flowchart showing processing of automatic control executed by the controller 10 according to a first preferred embodiment of the present invention. As shown in FIG. 4, in step S101, the controller 10 obtains the current position and the current direction of the watercraft 100. The controller 10 obtains the current position of the watercraft 100 based on the position data from the position sensor 24. The controller 10 obtains the current direction of the watercraft 100 based on the direction data from the direction sensor 25. The current direction of the watercraft 100 means a direction in which the bow of the watercraft 100 is oriented at a present point of time.

In step S102, the controller 10 obtains the position and the direction of a set point SP for the watercraft 100. The controller 10 obtains the position and the direction of the set point SP based on a signal from the input device 23. For example, the controller 10 stores the position and the direction of the watercraft 100 at a point of time when an operation of setting is performed through the input device 23 as the position and the direction of the set point SP. Alternatively, the controller 10 may store a position and a direction arbitrarily set by an operator's operation as the position and the direction of the set point SP.

Figure 5:
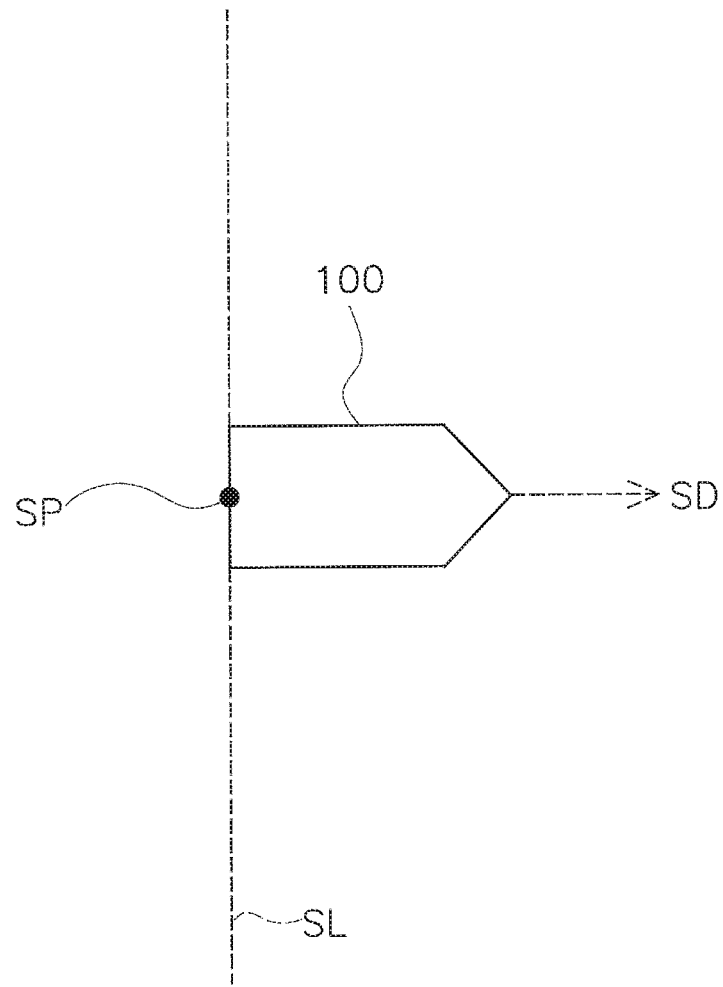
FIG. 5 is a diagram showing an exemplary setting of a standard direction and a standard line.

In step S103, the controller 10 determines a standard direction SD and a standard line SL. FIG. 5 is a diagram showing an exemplary setting of the standard direction SD and the standard line SL. The controller 10 determines the direction of the watercraft 100 at the set point SP as the standard direction SD. The controller 10 determines a straight line extending from the set point SP in a lateral direction as the standard line SL. It should be noted that the term "lateral direction" means a direction perpendicular or substantially perpendicular to the standard direction SD.

In step S104, the controller 10 updates the current position and the current direction of the watercraft 100. The controller 10 obtains the current position and the current direction of the watercraft 100 as it does in step S101, and updates them.

In step S105, the controller 10 compares the current position of the watercraft 100 and the standard line SL and determines whether or not the both are displaced in the front-and-back direction. It should be noted that the term "forth (forward)" refers to a standard direction (SD) side from the set point SP, whereas the term "back (rearward)" refers to the opposite side of the standard direction (SD)

side. For example, chances are that the watercraft 100 is displaced from the set point SP in the front-and-back direction due to impact of water streams or wind. In such a case, the controller 10 determines that the current position of the watercraft 100 and the standard line SL are displaced in the front-and-back direction. When the controller 10 determines occurrence of displacement in the front-and-back direction, the processing proceeds to step S106.

Figure 6A:
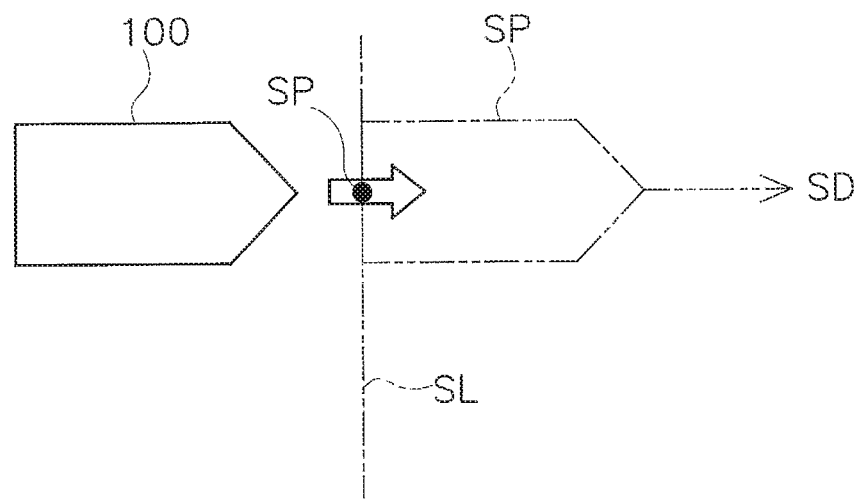
FIGS. 6A and 6B are diagrams showing exemplary motions of the watercraft under the automatic control.

In step S106, the controller 10 changes the position of the watercraft 100 in the front-and-back direction. For example, as shown in FIG. 6A, when the current position of the watercraft 100 is displaced rearward with respect to the standard line SL, the controller 10 controls the outboard motors 1a and 1b to move the watercraft 100 forward. Alternatively, when the current position of the watercraft 100 is displaced forward with respect to the standard line SL, the controller 10 controls the outboard motors 1a and 1b to move the watercraft 100 rearward. The controller 10 outputs command signals to the engines 1a and 1b and the shift actuators 7a and 7b such that the current position of the watercraft 100 is matched with the standard line SL in the front-and-back direction.

In step S107, the controller 10 compares the current direction of the watercraft 100 and the standard direction SD, and determines whether or not the both are displaced. For example, it is possible that the direction of the watercraft 100 has been changed due to the impact of water currents or wind. In such a case, the controller 10 determines that the current direction of the watercraft 100 and the standard direction SD are displaced. When the controller 10 determines occurrence of displacement in direction, the processing proceeds to step S108.

Figure 6B:
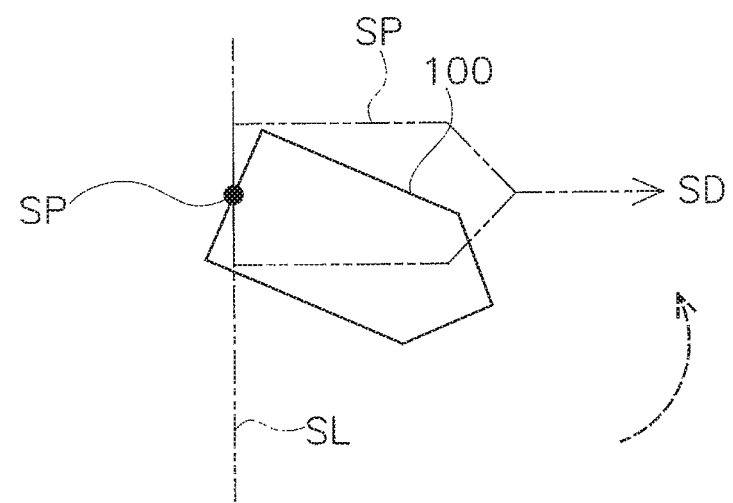

In step S108, the controller 10 changes the direction of the watercraft 100. For example, as shown in FIG. 6B, when the current direction of the watercraft 100 is displaced rightward with respect to the standard direction SD, the controller 10 controls the outboard motors 1a and 1b to turn the bow of the watercraft 100 leftward. Contrarily, when the current direction of the watercraft 100 is displaced leftward with respect to the standard direction SD, the controller 10 controls the outboard motors 1a and 1b to turn the bow of the watercraft 100 rightward.

The controller 10 controls the outboard motors 1a and 1b such that the current direction of the watercraft 100 is matched with the standard direction SD. For example, the controller 10 outputs command signals for changing the rudder angles of the outboard motors 1a and 1b to the steering actuators 8a and 8b. Alternatively, the controller 10 outputs command signals to the engines 1a and 1b and the shift actuators 7a and 7b so as to produce a difference in magnitude and/or direction of the thrusts generated by the outboard motors 1a and 1b.

As described above, the controller 10 controls the outboard motors 1a and 1b such that the current position of the watercraft 100 is matched with the standard line SL in the front-and-back direction. Additionally, the controller 10 controls the outboard motors 1a and 1b such that the current direction of the watercraft 100 is matched with the standard direction SD. Therefore, the controller 10 controls the outboard motors 1a and 1b such that the position of the watercraft 100 is maintained in the front-and-back direction with respect to the standard line SL, while the direction of the watercraft 100 is maintained along the standard direction SD.

Next in step S109, the controller 10 compares the current position of the watercraft 100 and the standard line SL and determines whether or not the both are displaced in the lateral direction. When the current position of the watercraft 100 is separated from the set point SP in the extending direction of the standard line SL, the controller 10 determines occurrence of displacement in lateral direction. When the controller 10 determines occurrence of displacement in lateral direction, the processing proceeds to step S110.

In step S110, the controller 10 changes the standard direction SD and the standard line SL. The controller 10 controls the outboard motors 1a and 1b to change the standard direction SD in a specific direction. The controller 10 determines the specific direction in accordance with the moving direction of the watercraft 100. When the watercraft 100 is moving rightward, the specific direction is a clockwise direction. When the watercraft 100 is moving leftward, the specific direction is a counterclockwise direction.

Figure 7:
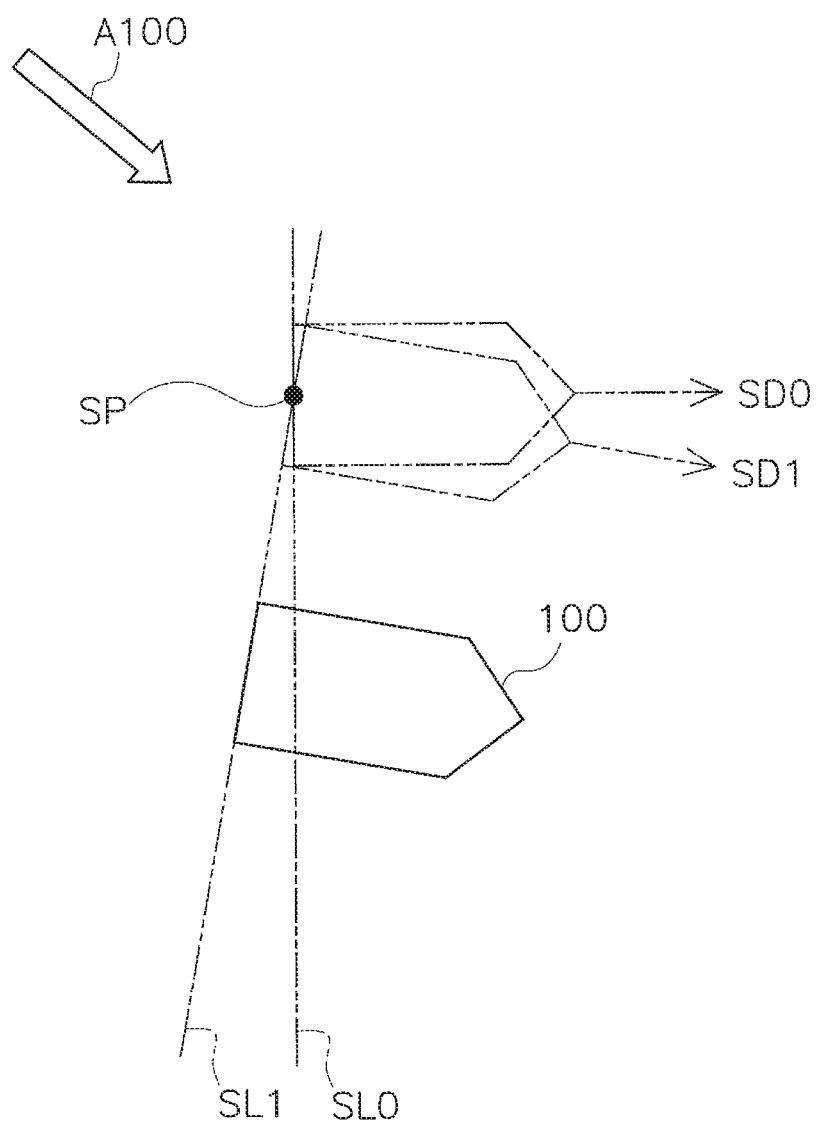
FIG. 7 is a diagram showing an example of changing the standard direction and the standard line under the automatic control according to the first preferred embodiment of the present invention.

Therefore, as shown in FIG. 7, when the watercraft 100 is moving rightward, the controller 10 changes the standard direction SD clockwise. In accordance with this, the controller 10 changes the standard line SL clockwise, too. Thus, the standard direction SD is changed from SD0 to SD1, while the standard line SL is changed from SL0 to SL1. It should be noted that when the watercraft 100 is moving leftward, the controller 10 changes the standard direction SD counterclockwise. In accordance with this, the controller 10 changes the standard line SL counterclockwise, too.

It should be noted that the controller 10 changes the standard direction SD and the standard line SL every unit of time. The amount of changing the standard direction SD may be constant. Alternatively, the amount of changing the standard direction SD may be variable in accordance with the condition of the watercraft 100. For example, the amount of changing the standard direction SD may be variable in accordance with distance per unit of time of the watercraft 100 moving in the lateral direction.

Next in step S111, the controller 10 determines whether or not a predetermined period of time has elapsed. When the predetermined period of time has not elapsed yet, the controller 10 activates a timer to count time in step S112, and thereafter, the processing returns to step S104. When the predetermined period of time has elapsed, the processing proceeds to step S113.

In step S113, the controller 10 determines whether or not displacement in the lateral direction has occurred as does in step S109. When the controller 10 determines that displacement in the lateral direction has not occurred, the processing proceeds to step S115 and the controller 10 resets the timer. When the controller 10 determines that displacement in the lateral direction has occurred, the processing proceeds to step S114. In step S114, the controller 10 changes the standard direction SD and the standard line SL as does in step S110. Then in step S115, the controller 10 resets the timer.

Thereafter, the processing returns to step S104. A series of processing from step S104 to step S115 are repeated. Accordingly, the controller 10 changes the direction of the watercraft 100 in accordance with the changed standard direction SD, and repeats determining the movement of the watercraft 100, changing the standard direction SD and changing the direction of the watercraft 100.

In the control system for the watercraft 100 according to the present preferred embodiment explained above, the outboard motors 1a and 1b are controlled such that the position of the watercraft 100 is maintained in the front-and-back direction with respect to the standard line SL extending from the set point SP in the lateral direction, while the direction of the watercraft 100 is maintained along the standard direction SD. Additionally, when the watercraft 100 is moving away from the set point SP in the lateral direction, the outboard motors 1a and 1b are controlled to change the standard direction SD in the specific direction. When the standard direction SD is changed, the direction of the watercraft 100 is changed in accordance with the changed standard direction SD. Then, determining the movement of the watercraft 100, changing the standard direction SD, and changing the direction of the watercraft 100 are repeated.

Figure 8:
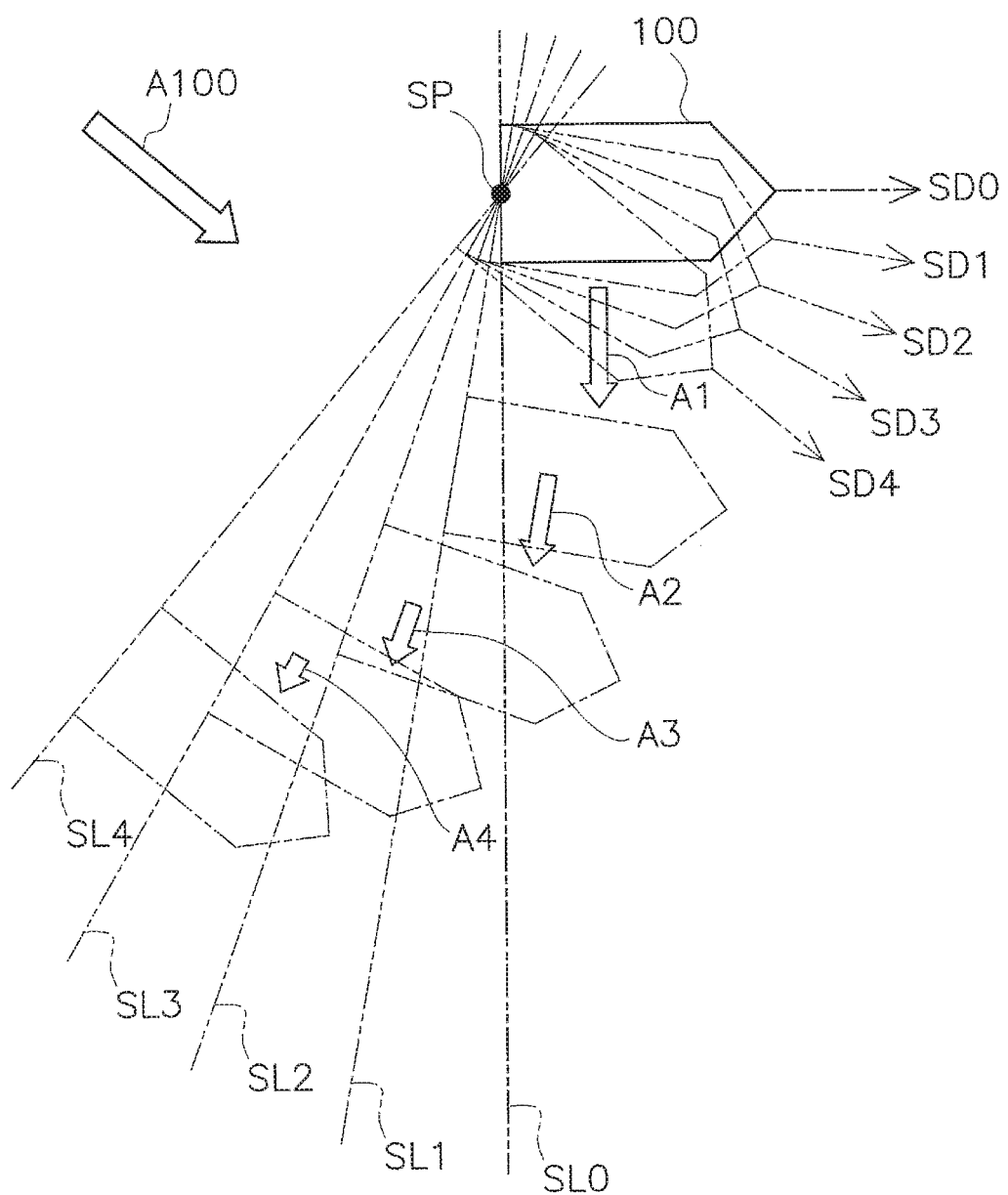
FIG. 8 is a diagram showing an example of change in position and direction of the watercraft under the automatic control.

FIG. 8 is a diagram showing changes to the watercraft 100 when determining the movement of the watercraft 100, changing the standard direction SD and changing the direction of the watercraft 100 are repeated. Arrows A1 to A4 are depicted in FIG. 8, and the length of each indicates distance per unit of time of the watercraft 100 moving in the lateral direction. Arrow A100 indicates a water current or a wind direction. Reference sign SD0 indicates the initial standard direction SD. Reference sign SL0 indicates the initial standard line SL.

As shown in FIG. 8, when water or wind flows toward the watercraft 100 in the lateral direction at the set point SP, the watercraft 100 is gradually moved away in the lateral direction. Accordingly, when the current position of the watercraft 100 is displaced from the set point SP in the lateral direction, the controller 10 changes the standard direction SD in the specific direction. Accordingly, the standard direction SD is changed from SD0 to SD1, while the standard line SL is changed from SL0 to SL1.

When the standard direction SD and the standard line SL are changed, the controller 10 controls the outboard motors 1a and 1b such that the watercraft 100 is oriented along the changed standard direction SD1. Additionally, the controller 10 controls the outboard motors 1a and 1b such that the position of the watercraft 100 is maintained in the front-and-back direction with respect to the changed standard line SL1. Accordingly, the direction of the watercraft 100 gets close to the direction A100 in which the watercraft 100 is moved away.

When the standard direction SD is changed to SD1 and then displacement in the lateral direction still remains, the controller 10 further changes the standard direction SD in the specific direction. Accordingly, the standard direction SD is changed from SD1 to SD2, while the standard line SL is changed from SL1 to SL2. Consequently, the direction of the watercraft 100 gets closer to the direction A100 in which the watercraft 100 is moved away.

As depicted with SL2 to SL4, the standard direction SD is further changed repeatedly, the direction of the watercraft 100 is oriented approximately along the direction A100 in which the watercraft 100 is moved away. In this condition, the watercraft 100 is hardly moved away in the lateral direction.

Figure 9:
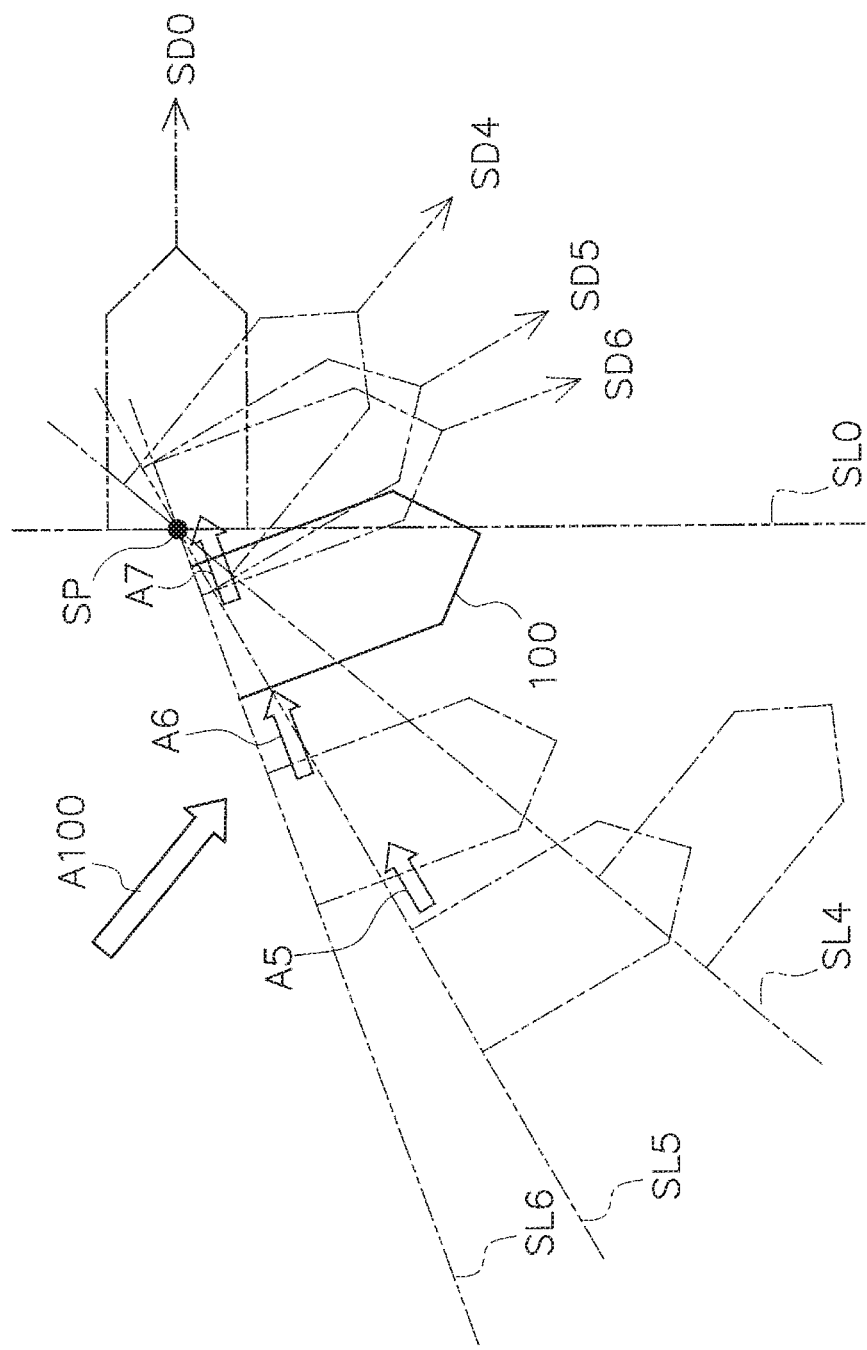
FIG. 9 is a diagram showing an example of change in position and direction of the watercraft under the automatic control.

As shown in FIG. 9, when the controller 10 further changes the standard direction SD from SD4 to SD5 and also further changes the standard line SL from SL4 to SL5, the direction of the watercraft 100 oppositely separates from the direction A100 in which the watercraft 100 is moved away. Therefore, the watercraft 100 starts being moved away oppositely in the lateral direction. In other words, as depicted with arrow A5, the watercraft 100 starts moving to approach the set point SP in the lateral direction.

When the controller 10 further changes the standard direction SD from SD5 to SD6 and also further changes the standard line SL from SL5 to SL6, the velocity of the watercraft 100 moving away oppositely in the lateral direction increases as depicted with arrow A6. The watercraft 100 further approaches the set point SP in the lateral direction, and as depicted with arrow A7, returns to the original position, i.e., the set point SP.

When the watercraft 100 returns to the set point SP, the controller 10 changes the standard direction SD in the opposite direction to the specific direction. Additionally, when the watercraft 100 separates from the set point SP in the lateral direction, the controller 10 changes the standard direction SD in the specific direction. The controller 10 repeatedly changes the standard direction SD in this way, such that the position of the watercraft 100 converges to the set point SP.

In the control system for the watercraft 100 according to the present preferred embodiment as described above, the direction of the watercraft 100 is gradually changed in the specific direction, such that the watercraft 100 is able to be quietly moved toward the set point SP without being frequently changed in direction.

Next, processing of automatic control according to a second preferred embodiment of the present invention will be explained. In the aforementioned first preferred embodiment, when the watercraft 100 is moving rightward, the specific direction is the clockwise direction. When the watercraft 100 is moving leftward, the specific direction is the counterclockwise direction. In this case, the position of the watercraft 100 is able to be maintained while the stern of the watercraft 100 faces the water current or wind.

Figure 10:
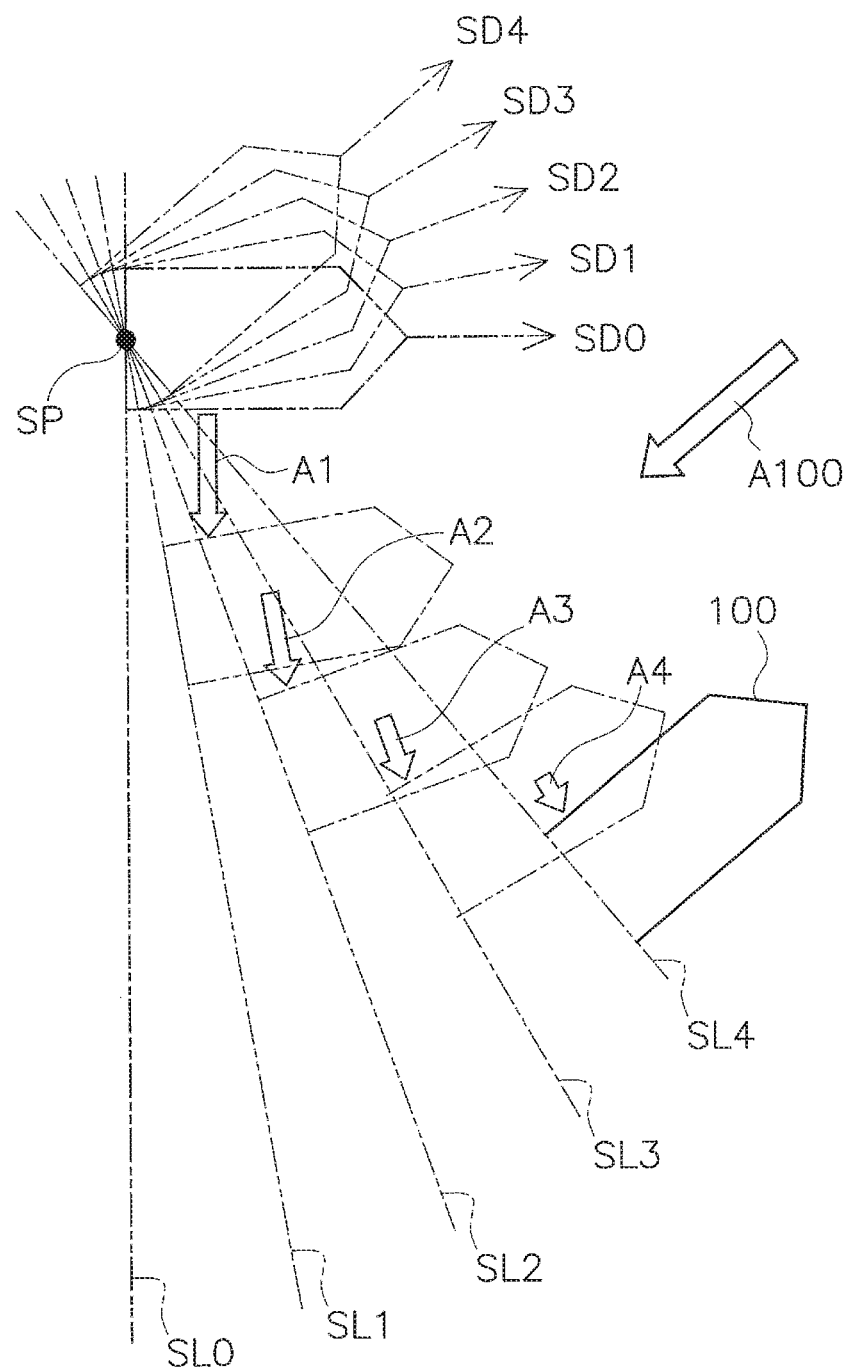
FIG. 10 is a diagram showing an example of changing the standard direction and the standard line under automatic control in a second preferred embodiment of the present invention.

FIG. 10 is a diagram showing a setting of changing the standard direction SD and the standard line SL under the automatic control according to the second preferred embodiment. Under the automatic control according to the second preferred embodiment, the specific direction is the counterclockwise direction when the watercraft 100 is moving rightward, whereas the specific direction is the clockwise direction when the watercraft 100 is moving leftward.

Therefore, under the automatic control according to the second preferred embodiment, when the watercraft 100 is moving rightward as depicted with arrows A1 to A4 in FIG. 10, the controller 10 sequentially changes the standard direction SD to SD1, SD2, SD3 and then SD4 counterclockwise. Contrarily, when the watercraft 100 is moving leftward, the controller 10 changes the standard direction SD clockwise.

The other processes of the automatic control according to the second preferred embodiment are similar to those of the automatic control according to the first preferred embodiment. As shown in FIG. 10, under the automatic control according to the second preferred embodiment, the position of the watercraft 100 is able to be maintained while the bow of the watercraft 100 faces the water current or wind.

Next, processing of automatic control according to a third preferred embodiment will be explained. In the third preferred embodiment, the input device 23 outputs a command signal indicating one selected from a first control mode and a second control mode in accordance with the input by the operator. The controller 10 receives the command signal indicating the first or second control mode from the input device 23.

In the first control mode, the specific direction is the clockwise direction when the watercraft 100 is moving rightward as shown in FIGS. 8 and 9, whereas the specific direction is the counterclockwise direction when the watercraft 100 is moving leftward. Therefore, in the first control mode, the controller 10 changes the standard direction SD clockwise when the watercraft 100 is moving rightward, whereas the controller 10 changes the standard direction SD counterclockwise when the watercraft 100 is moving leftward.

As shown in FIG. 10, in the second control mode, the specific direction is the counterclockwise direction when the watercraft 100 is moving rightward, whereas the specific direction is the clockwise direction when the watercraft 100 is moving leftward. Therefore, in the second control mode, the controller 10 changes the standard direction SD counterclockwise when the watercraft 100 is moving rightward, whereas the controller 10 changes the standard direction SD clockwise when the watercraft 100 is moving leftward.

The other processing of the automatic control according to the third preferred embodiment are similar to those of the automatic control according to the first preferred embodiment. Under the automatic control according to the third preferred embodiment, the operator is allowed to arbitrarily select which of the bow and stern of the watercraft 100 should face the water current or wind at the set point SP.

Next, processing of automatic control according to a fourth preferred embodiment will be explained. In the fourth preferred embodiment, the controller 10 automatically selects one of the first and second control modes in accordance with the condition of the watercraft 100.

Figure 11:
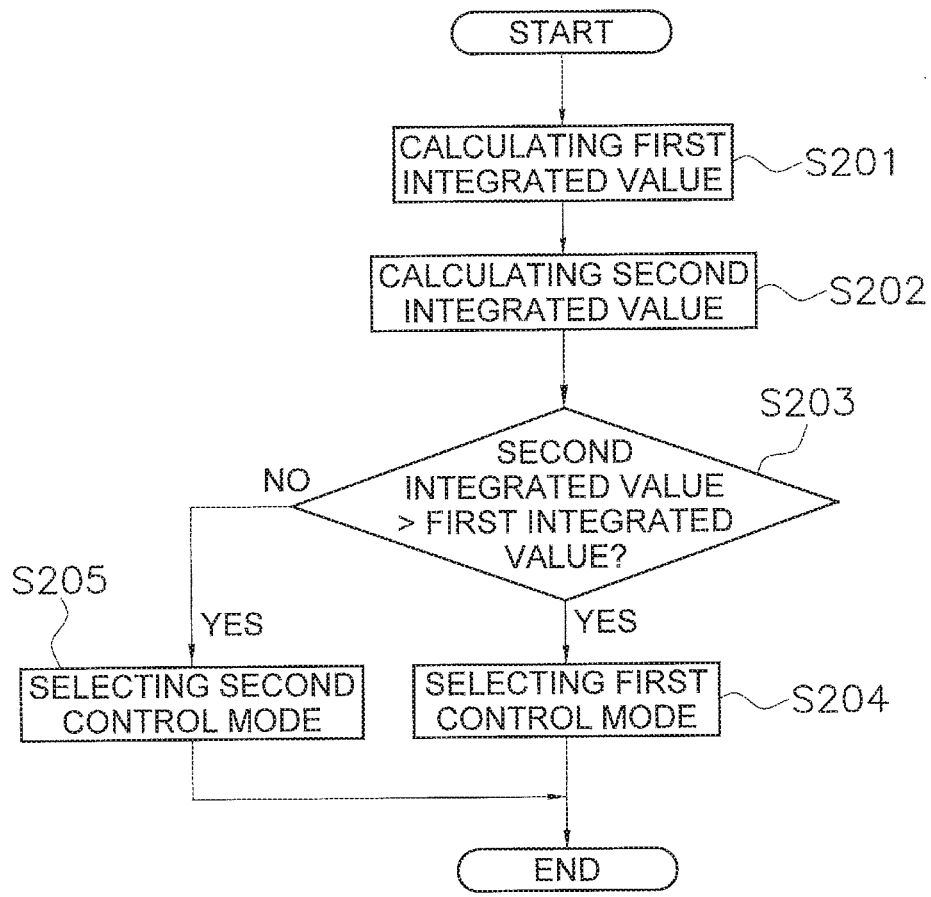
FIG. 11 is a flowchart showing processing of automatic control according to a fourth preferred embodiment of the present invention.

FIG. 11 is a flowchart showing processing of the automatic control according to the fourth preferred embodiment. As shown in FIG. 11, in step S201, the controller 10 calculates a first integrated value. The first integrated value is an integrated value of the amount of controlling the outboard motors 1a and 1b to move the watercraft 100 forward in a predetermined period of time. The amount of controlling the outboard motors 1a and 1b to move the watercraft 100 forward is, for instance, a period of time that each of the outboard motors 1a and 1b generates a thrust for forward movement. It should be noted that the amount of controlling is not limited to the period of time of generating the thrust, and alternatively, may be another parameter such as the magnitude of the thrust or the engine rotational speed.

In step S202, the controller 10 calculates a second integrated value. The second integrated value is an integrated value of the amount of controlling the outboard motors 1a and 1b to move the watercraft 100 rearward in a predetermined period of time. The amount of controlling the outboard motors 1a and 1b to move the watercraft 100 rearward is, for instance, a period of time that each of the outboard motors 1a and 1b generates a thrust for rearward movement. It should be noted that the amount of controlling is not limited to the period of time of generating the thrust, and alternatively, may be another parameter such as the magnitude of the thrust or the engine rotational speed.

In step S203, the controller 10 determines whether or not the second integrated value is greater than the first integrated value. When the second integrated value is greater than the first integrated value, the controller 10 selects the first control mode in step S204. When the second integrated value is less than or equal to the first integrated value, the controller 10 selects the second control mode in step S205.

Figure 12A:
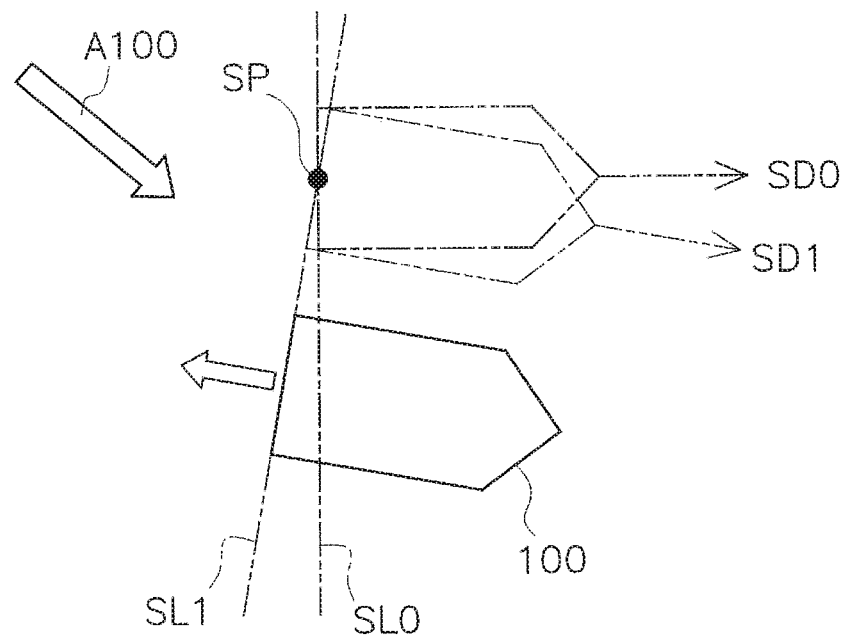
FIGS. 12A and 12B are diagrams showing exemplary motions of the watercraft under the automatic control according to the fourth preferred embodiment of the present invention.

As shown in FIG. 12A, when the watercraft 100 receives the water current or wind at the stern, the watercraft 100 is likely to be moved away forward. In this case, to maintain the position of the watercraft 100 in the front-and-back direction, the outboard motors 1a and 1b are controlled to move the watercraft 100 rearward. Therefore, the amount of controlling the outboard motors 1a and 1b to move the watercraft 100 rearward (the second integrated value) becomes greater than that of controlling the outboard motors 1a and 1b to move the watercraft 100 forward (the first integrated value). Therefore, when the second integrated value is greater than the first integrated value, the controller 10 determines that the watercraft 100 receives the water current or wind at the stern, and selects the first control mode. Accordingly, the position of the watercraft 100 is maintained while the stern of the watercraft 100 faces the water current or wind.

Figure 12B:
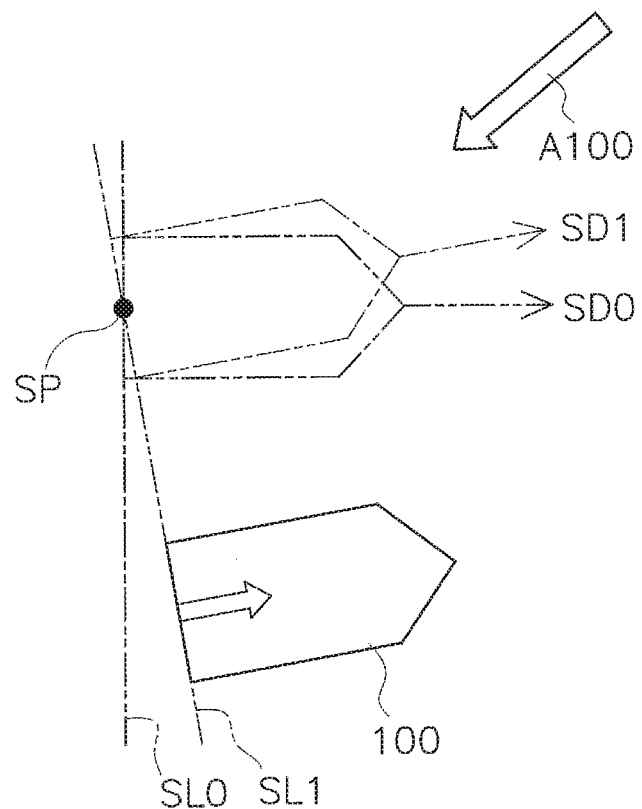

As shown in FIG. 12B, when the watercraft 100 receives the water current or wind at the bow, the watercraft 100 is likely to be moved away rearward. In this case, for maintaining the position of the watercraft 100 in the front-and-back direction, the outboard motors 1a and 1b are controlled to move the watercraft 100 forward. Therefore, the amount of controlling the outboard motors 1a and 1b to move the watercraft 100 forward (the first integrated value) becomes greater than the amount of controlling the outboard motors 1a and 1b to move the watercraft 100 rearward (the second integrated value). Therefore, when the second integrated value is less than or equal to the first integrated value, the controller 10 determines that the watercraft 100 receives the water current or wind at the bow, and selects the second control mode. Accordingly, the position of the watercraft 100 is maintained while the bow thereof faces the water current or wind.

The other processes of the automatic control according to the fourth preferred embodiment are similar to those of the automatic control according to the first preferred embodiment. Under the automatic control according to the fourth preferred embodiment, the controller 10 automatically selects one of the first and second control modes in accordance with the direction of the water current or wind received by the watercraft 100. Therefore, the watercraft 100 is able to be quickly returned to the set point SP.

Figure 13:
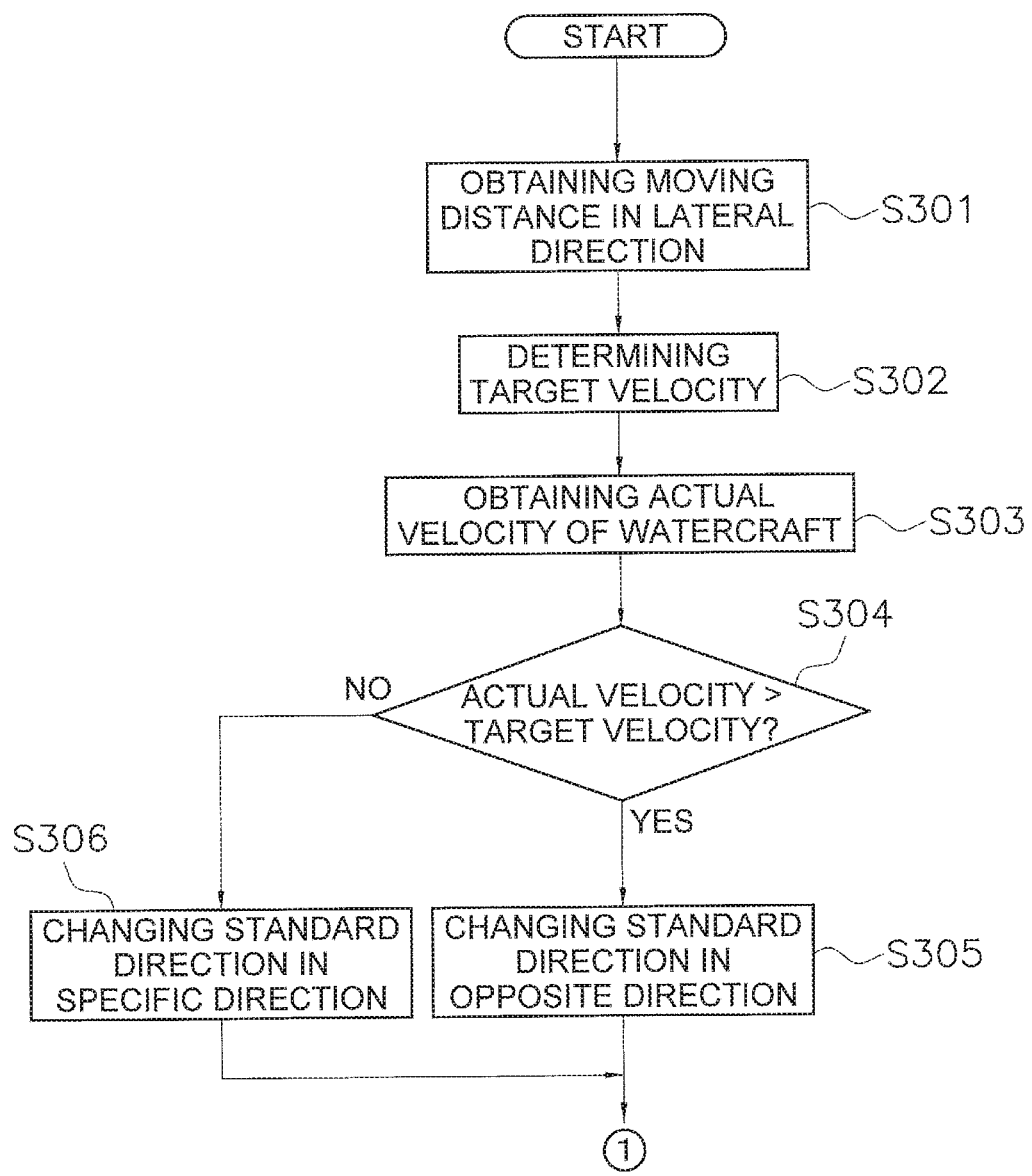
FIG. 13 is a flowchart showing processing of automatic control according to a fifth preferred embodiment of the present invention.

Next, processing of automatic control according to a fifth preferred embodiment will be explained. Under the automatic control according to the fifth preferred embodiment, the controller 10 corrects the standard direction SD in accordance with deviation of an actual velocity of the watercraft 100 from a target velocity thereof. FIG. 13 is a flowchart showing processing of the automatic control according to the fifth preferred embodiment. The controller 10 executes the processing shown in FIG. 13 instead of step S110 in the first preferred embodiment.

As shown in FIG. 13, in step S301, the controller 10 obtains distance of the watercraft 100 moving from the set point SP in the lateral direction. The controller 10 calculates the distance of the watercraft 100 moving from the set point SP in the lateral direction based on the position of the set point SP, the current position of the watercraft 100 and the standard direction SD.

In step S302, the controller 10 determines a target velocity of the watercraft 100 moving to approach the set point SP in the lateral direction in accordance with the moving distance of the watercraft 100. The controller 10 increases the target velocity with increase in moving distance. Contrarily, the controller 10 reduces the target velocity with reduction in moving distance. In other words, the controller 10 reduces the target velocity with proximity of the watercraft 100 to the set point SP in the lateral direction. For example, the controller 10 has preliminarily stored target velocity data defining a relation between the moving distance and the target velocity. The controller 10 determines the target velocity based on the moving distance with reference to the target velocity data. The target velocity data is preferably provided as a table, for example, or alternatively, may be provided as a mathematical formula or so forth.

In step S303, the controller 10 obtains the actual velocity of the watercraft 100 moving to approach the set point SP in the lateral direction. For example, the controller 10 calculates the actual velocity of the watercraft 100 based on the position data received from the position sensor 24. Alternatively, when the watercraft 100 includes a vessel velocity sensor, the controller 10 may obtain the actual velocity of the watercraft 100 based on a signal received from the vessel velocity sensor.

Figure 14:
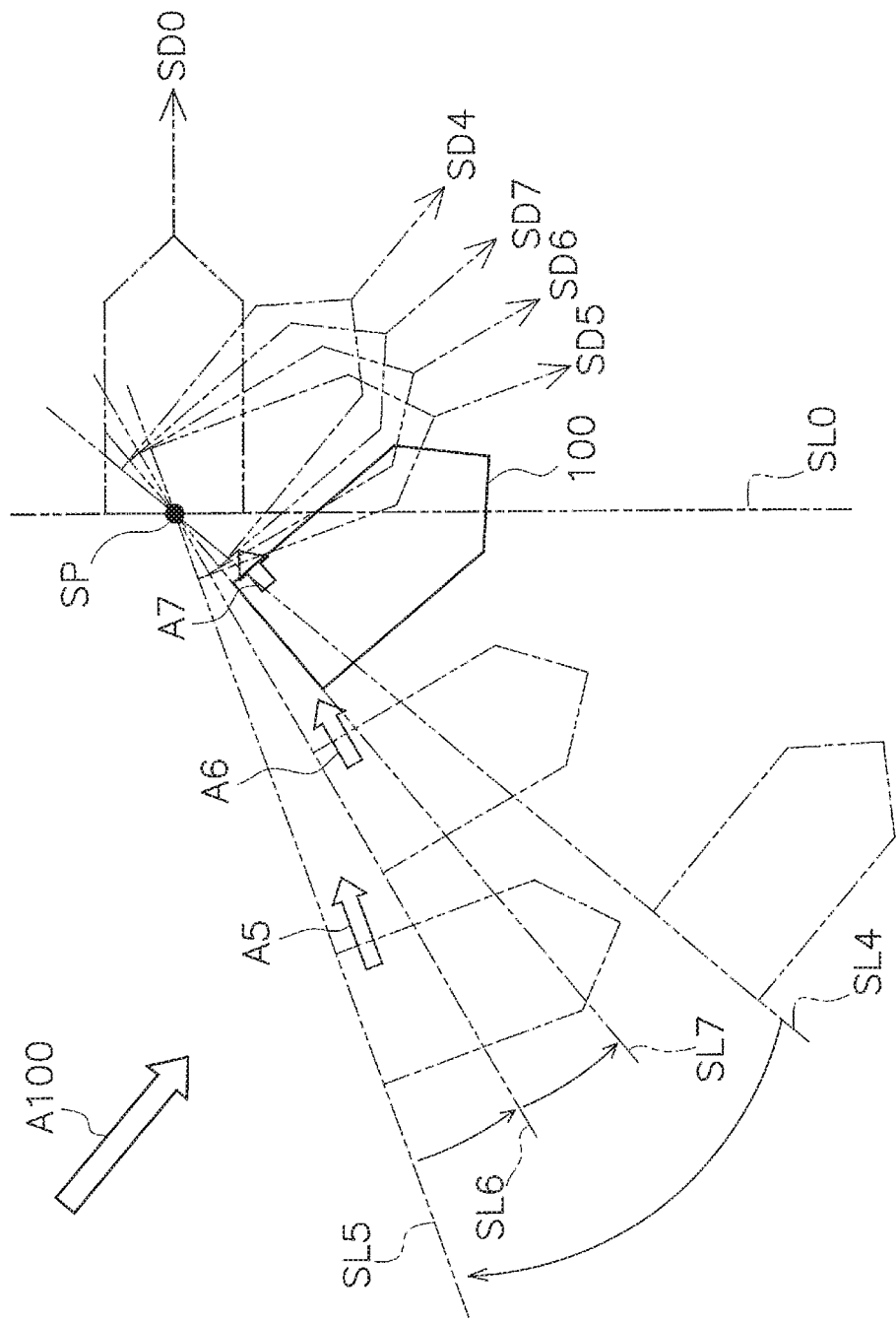
FIG. 14 is a diagram showing an example of changing the standard direction and the standard line under the automatic control according to the fifth preferred embodiment of the present invention.

In step S304, the controller 10 determines whether or not the actual velocity is greater than the target velocity. For example, as shown in FIG. 14, when the standard direction SD is further changed from SD4, which is a state that the watercraft 100 is oriented parallel or approximately in parallel to the water current or wind, to SD5 in the specific direction, the standard line SL is changed from SL4 to SL5. Accordingly, as depicted with arrow A5, the watercraft 100 moves to return to the set point SP in the lateral direction. In this case, when the actual velocity of the watercraft 100 is greater than the target velocity in approach to the set point SP in the lateral direction, the processing proceeds to step S305.

In step S305, the controller 10 changes the standard direction SD in the opposite direction to the specific direction. Accordingly, as shown in FIG. 14, the standard direction SD is changed from SD5 to SD6, while the standard line SL is changed from SL5 to SL6. Thus, as depicted with arrow A6, the velocity of the watercraft 100 moving to approach the set point SP in the lateral direction reduces.

Additionally, the controller 10 further changes the standard direction SD from SD6 to SD7 in the opposite direction to the specific direction, such that the standard line SL is changed from SL6 to SL7. Accordingly, as depicted with arrow A7, the velocity of the watercraft 100 moving to approach the set point SP in the lateral direction further reduces.

It should be noted that in step S305, the controller 10 changes the standard direction SD in accordance with a difference between the actual velocity and the target velocity. The controller 10 increases the amount of changing the standard direction SD in the opposite direction to the specific direction with increase in difference between the actual velocity and the target velocity.

In step S304, when the actual velocity is less than or equal to the target velocity, the processing proceeds to step S306. In step S306, the controller 10 changes the standard direction SD in the specific direction. Accordingly, the velocity of the watercraft 100 moving to approach the set point SP in the lateral direction increases. As described above, a series of processing from step S301 to step S307 are repeated, such that the watercraft 100 reaches the set point SP with gradual deceleration.

Next, processing of automatic control according to a sixth preferred embodiment will be explained. Under the automatic control according to the sixth preferred embodiment, the controller 10 calculates a rate of change indicating a ratio of the amount of change in actual velocity to the amount of changing the direction of the watercraft 100. The controller 10 determines a target amount of changing the standard direction SD based on the difference between the actual velocity and the target velocity and the rate of change. Here, the velocity is defined as meaning the velocity of the watercraft 100 moving in the lateral direction.

Specifically, the controller 10 determines a target amount X2 of changing the standard direction SD based on the following formula (1).

$$X2 = Y2/(Y1/X1) \times \alpha \qquad (1)$$

In the formula (1), "X1" is an amount of changing the standard direction SD at a previous point of time and "Y1" is an amount of change in actual velocity at the previous point of time. Therefore, "Y1/X1" is a rate of change indicating a ratio of the amount of change in actual velocity to the amount of changing the standard direction SD at the previous point of time. The controller 10 obtains and keeps storing the amount of changing the standard direction SD at the previous point of time that the standard direction SD has been changed and the amount of change in actual velocity corresponding thereto.

In the formula (1), "Y2" is a difference between the actual velocity at a present point of time and the target velocity. As does in step S302 of FIG. 13 described above, the controller 10 determines the target velocity in accordance with the distance of the watercraft 100 moving from the set point SP in the lateral direction. "a" is a predetermined coefficient. For example, a value for preventing occurrence of overshoot attributed to an error is set as "a".

Under the automatic control according to the sixth preferred embodiment, the target amount X2 of changing the standard direction SD is determined based on the rate of change indicating the ratio of the amount of change in actual velocity to the amount of changing the standard direction SD. Therefore, it is possible to precisely determine the target changing amount X2 to cause the actual velocity approach the target velocity.

Some preferred embodiments of the present invention have been explained above. However, the present invention is not limited to the aforementioned preferred embodiments, and a variety of changes can be made without departing from the gist of the present invention.

The aforementioned preferred embodiments have described the outboard motor as an exemplary type of propulsion device. However, the propulsion device is not limited to the outboard motor, and alternatively, may be another type of device such as, for example, an inboard engine outboard drive, a jet propulsion device, etc. The number of propulsion devices is not limited to two, and alternatively, may be one or may be more than two.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A system for controlling a watercraft, the system comprising:
   a propulsion device;
   a sensor that detects a position and a direction of the watercraft; and
   a controller that communicates with the propulsion device and the sensor, the controller being configured or programmed to:
   obtain a position and a direction of a set point for the watercraft;
   obtain position data and direction data, the position data indicating a current position of the watercraft, the direction data indicating a current direction of the watercraft;
   control the propulsion device such that the position of the watercraft is maintained in a front-and-back direction with respect to a standard line extending from the set point in a lateral direction while the direction of the watercraft is maintained along a standard direction defined as the direction of the set point;
   determine whether or not the watercraft is moving away from the set point in the lateral direction;

change the standard direction in a specific direction by
controlling the propulsion device when it is determined that the watercraft is moving away from the
set point in the lateral direction;
change the direction of the watercraft in accordance
with the changed standard direction; and
repeat determining whether or not the watercraft is
moving, changing the standard direction and changing the direction of the watercraft.

2. The system according to claim 1, wherein the controller is further configured or programmed to:
change the standard direction clockwise when the watercraft is moving rightward; and
change the standard direction counterclockwise when the watercraft is moving leftward.

3. The system according to claim 1, wherein the controller is further configured or programmed to:
change the standard direction counterclockwise when the watercraft is moving rightward; and
change the standard direction clockwise when the watercraft is moving leftward.

4. The system according to claim 1, further comprising:
an input device that outputs a command signal indicating one of a first control mode and a second control mode in accordance with an input by an operator; wherein
the controller is further configured or programmed to:
in the first control mode, change the standard direction clockwise when the watercraft is moving rightward, and change the standard direction counterclockwise when the watercraft is moving leftward; and
in the second control mode, change the standard direction counterclockwise when the watercraft is moving rightward, and change the standard direction clockwise when the watercraft is moving leftward.

5. The system according to claim 1, wherein the controller is further configured or programmed to:
calculate an integrated value of an amount of controlling the propulsion device to move the watercraft forward as a first integrated value;
calculate an integrated value of an amount of controlling the propulsion device to move the watercraft rearward as a second integrated value;
select a first control mode when the second integrated value is greater than the first integrated value in a predetermined period of time; and
in the first control mode, change the standard direction clockwise when the watercraft is moving rightward, and change the standard direction counterclockwise when the watercraft is moving leftward.

6. The system according to claim 1, wherein the controller is further configured or programmed to:
calculate an integrated value of an amount of controlling the propulsion device to move the watercraft forward as a first integrated value;
calculate an integrated value of an amount of controlling the propulsion device to move the watercraft rearward as a second integrated value;
select a second control mode when the first integrated value is greater than the second integrated value in a predetermined period of time; and
in the second control mode, change the standard direction counterclockwise when the watercraft is moving rightward, and change the standard direction clockwise when the watercraft is moving leftward.

7. The system according to claim 1, wherein the controller is further configured or programmed to repeat changing the standard direction in the specific direction at least until the watercraft starts moving to approach the set point in the lateral direction.

8. The system according to claim 7, wherein the controller is further configured or programmed to change the standard direction in an opposite direction to the specific direction when the watercraft has returned to the set point.

9. The system according to claim 1, wherein the controller is further configured or programmed to:
determine a target velocity of the watercraft moving to approach the set point in the lateral direction;
obtain an actual velocity of the watercraft moving to approach the set point; and
change the standard direction in accordance with a difference between the actual velocity and the target velocity.

10. The system according to claim 9, wherein the controller is further programmed to change the standard direction in an opposite direction to the specific direction when the actual velocity is greater than the target velocity.

11. The system according to claim 9, wherein the controller is further configured or programmed to:
obtain a moving distance of the watercraft from the set point in the lateral direction; and
determine the target velocity in accordance with the moving distance.

12. The system according to claim 9, wherein the controller is further configured or programmed to:
calculate a rate of change indicating a ratio of an amount of change in the actual velocity to an amount of changing the direction of the watercraft; and
determine a target amount of changing the standard direction based on the rate of change and the difference between the actual velocity and the target velocity.

13. A method of controlling a watercraft including a propulsion device, the method comprising:
obtaining a position and a direction of a set point for the watercraft;
obtaining position data and direction data, the position data indicating a current position of the watercraft, the direction data indicating a current direction of the watercraft;
controlling the propulsion device such that the position of the watercraft is maintained in a front-and-back direction with respect to a standard line extending from the set point in a lateral direction while the direction of the watercraft is maintained along a standard direction defined as the direction of the set point;
determining whether or not the watercraft is moving away from the set point in the lateral direction;
changing the standard direction in a specific direction by controlling the propulsion device when it is determined that the watercraft is moving away from the set point in the lateral direction;
changing the direction of the watercraft in accordance with the changed standard direction; and
repeating determining whether or not the watercraft is moving, changing the standard direction and changing the direction of the watercraft.

14. The method according to claim 13, wherein the changing the standard direction includes:
changing the standard direction clockwise when the watercraft is moving rightward; and
changing the standard direction counterclockwise when the watercraft is moving leftward.

15. The method according to claim 13, wherein the changing the standard direction includes:

changing the standard direction counterclockwise when the watercraft is moving rightward; and changing the standard direction clockwise when the watercraft is moving leftward.

16. The method according to claim 13, further comprising:

receiving a command signal indicating one of a first control mode and a second control mode by an operator; wherein the changing the standard direction includes:

changing the standard direction clockwise when the watercraft is moving rightward in the first control mode and changing the standard direction counterclockwise when the watercraft is moving leftward in the first control mode; and changing the standard direction counterclockwise when the watercraft is moving rightward in the second control mode and changing the standard direction clockwise when the watercraft is moving leftward in the second control mode.

17. The method according to claim 13, further comprising:

calculating an integrated value of an amount of controlling the propulsion device to move the watercraft forward as a first integrated value;

calculating an integrated value of an amount of controlling the propulsion device to move the watercraft rearward as a second integrated value;

selecting a first control mode when the second integrated value is greater than the first integrated value in a predetermined period of time; and selecting a second control mode when the first integrated value is greater than the second integrated value in the predetermined period of time; wherein the changing the standard direction includes:

changing the standard direction clockwise when the watercraft is moving rightward in the first control mode and changing the standard direction counterclockwise when the watercraft is moving leftward in the first control mode; and changing the standard direction counterclockwise when the watercraft is moving rightward in the second control mode and changing the standard direction clockwise when the watercraft is moving leftward in the second control mode.

18. The method according to claim 13, further comprising:

repeating changing the standard direction in the specific direction at least until the watercraft starts moving to approach the set point in the lateral direction.

19. The method according to claim 13, further comprising:

determining a target velocity of the watercraft moving to approach the set point in the lateral direction;

obtaining an actual velocity of the watercraft moving to approach the set point; and changing the standard direction in accordance with a difference between the actual velocity and the target velocity.

20. The method according to claim 19, further comprising:

changing the standard direction in an opposite direction to the specific direction when the actual velocity is greater than the target velocity.

* * * * *